United States Patent
Barari et al.

(10) Patent No.: US 10,423,659 B2
(45) Date of Patent: Sep. 24, 2019

(54) METHOD AND SYSTEM FOR GENERATING A CONTEXTUAL AUDIO RELATED TO AN IMAGE

(71) Applicant: Wipro Limited, Bangalore (IN)

(72) Inventors: Adrita Barari, Kolkata (IN); Manjunath Ramachandra, Bangalore (IN); Ghulam Mohiuddin Khan, Bangalore (IN); Sethuraman Ulaganathan, Tiruchirapalli (IN)

(73) Assignee: Wipro Limited, Bangalore (IN)

( * ) Notice: Subject to any disclaimer, the term of this patent is extended or adjusted under 35 U.S.C. 154(b) by 85 days.

(21) Appl. No.: 15/679,806

(22) Filed: Aug. 17, 2017

(65) Prior Publication Data
US 2019/0005128 A1 Jan. 3, 2019

(30) Foreign Application Priority Data
Jun. 30, 2017 (IN) .............................. 201741023038

(51) Int. Cl.
*G06F 17/00* (2019.01)
*G06F 16/683* (2019.01)
(Continued)

(52) U.S. Cl.
CPC ............ *G06F 16/683* (2019.01); *G06F 16/58* (2019.01); *H04N 21/439* (2013.01); *H04N 21/44008* (2013.01); *H04N 21/8153* (2013.01); *H04N 21/858* (2013.01); *G06K 9/00201* (2013.01); *G06K 9/00624* (2013.01)

(58) Field of Classification Search
CPC ...................................................... G06F 3/165
See application file for complete search history.

(56) References Cited

U.S. PATENT DOCUMENTS

| 9,031,243 | B2 | 5/2015 | Leboeuf et al. | |
|---|---|---|---|---|
| 2004/0037540 | A1* | 2/2004 | Frohlich | G11B 31/006 386/285 |

(Continued)

OTHER PUBLICATIONS

Soler, et al., "Suggesting Sounds For Images From Video Collections", 17 pages, Retrieved from the Internet:<http://www.ahornung.net/files/pub/2016-eccvws-suggestingsounds-soler.pdf>.

*Primary Examiner* — Joseph Saunders, Jr.
(74) *Attorney, Agent, or Firm* — Pepper Hamilton LLP (57) ABSTRACT

Disclosed subject matter relates to digital media including a method and system for generating a contextual audio related to an image. An audio generating system may determine scene-theme and viewer theme of scene in the image. Further, audio files matching scene-objects and the contextual data may be retrieved in real-time and relevant audio files from audio files may be identified based on relationship between scene-theme, scene-objects, viewer theme, contextual data and metadata of audio files. A contribution weightage may be assigned to the relevant and substitute audio files based on contextual data and may be correlated based on contribution weightage, thereby generating the contextual audio related to the image. The present disclosure provides a feature wherein the contextual audio generated for an image may provide a holistic audio effect in accordance with context of the image, thus recreating the audio that might have been present when the image was captured.

17 Claims, 4 Drawing Sheets

(51) Int. Cl.
*H04N 21/439* (2011.01)
*G06F 16/58* (2019.01)
*H04N 21/44* (2011.01)
*H04N 21/81* (2011.01)
*H04N 21/858* (2011.01)
*G06K 9/00* (2006.01)

(56) References Cited

U.S. PATENT DOCUMENTS

2014/0314391 A1 10/2014 Kim et al.
2015/0025662 A1* 1/2015 Di Censo ................. G06F 3/011
              700/94
2015/0310012 A1 10/2015 Kim et al.
2017/0371959 A1* 12/2017 Osotio .................... G06F 3/162

* cited by examiner

METHOD AND SYSTEM FOR GENERATING A CONTEXTUAL AUDIO RELATED TO AN IMAGE

This application claims the benefit of Indian Patent Application Serial No. 201741023038, filed Jun. 30, 2017, which is hereby incorporated by reference in its entirety.

FIELD

The present subject matter relates generally to digital media, and more particularly, but not exclusively to a method and a system for generating a contextual audio related to an image.

BACKGROUND

The current era is an era of digital media that consists of still images in abundance, that are captured through image capturing devices such as camera, mobile and the like. The still images capture only the actions and objects of a certain moment but do not capture sounds associated with the actions and objects, thereby failing to provide experience of a video. As an example, when people go through still images of a vacation they had been to, the audio behind those still images at the time and location when the image was captured would not be present. Capturing a video may provide the audio as well, but videos consume a lot of storage space.

Few of the existing techniques use digital still images and generate short Graphics Interchange Format (GIF) videos. This technique uses a generative adversarial network for a video, with a convolutional architecture that untangles the scene's foreground from the background and generates tiny videos up to a second at full frame rate better than simple baselines. However, this technique does not synthesize audio/sounds that could possibly have been associated with scene present in the digital still images.

Further, the existing techniques disclose displaying image combined with playing audio in an electronic device. In this technique, the audio of objects in the image are extracted and played individually. Therefore, the holistic audio of the image is not achieved as multiple audios corresponding to different objects in the image are played individually. The audio of the objects achieved using this technique is static that does not retain dynamics of the image to produce the overall audio of the image. Another existing technique discloses identifying and filtering out uncorrelated audio data for various images, which in turn provides a filtered collection of correlated audio-visual examples. Further, the suitable audio is selected from the video having similar image frames with more focus provided to a particular object's activity in the image. However, this technique also fails in providing the holistic audio that would have existed while capturing the image.

SUMMARY

One or more shortcomings of the prior art may be overcome and additional advantages may be provided through the present disclosure. Additional features and advantages may be realized through the techniques of the present disclosure. Other embodiments and aspects of the disclosure are described in detail herein and are considered a part of the claimed disclosure.

Disclosed herein is a method of generating a contextual audio related to an image. The method includes determining, by an audio generating system, scene-theme of a scene in the image by analyzing the image received from an image repository. The scene-theme may be determined based on key image features in the image and one or more scene-objects, corresponding to the key image features, in the image. Further, the audio generating system may determine a viewer theme of the image based on contextual data associated with the image. Upon determining the viewer theme, the audio generating system, may generate one or more audio files matching the one or more scene-objects and the contextual data in real-time by performing a real-time search using textual descriptions of the one or more scene-objects and the contextual data. Further, the audio generating system may identify one or more relevant audio files from the one or more audio files based on relationship between the scene-theme, the one or more scene-objects, the viewer theme, the contextual data and metadata of the one or more audio files. Furthermore, the audio generating system may assign a contribution weightage to each of the one or more relevant audio files and one or more substitute audio files based on the contextual data. Finally, the audio generating system may correlate the one or more relevant audio files and the one or more substitute audio files based on the contribution weightage, thereby generating the contextual audio related to the image.

Further, the present disclosure includes an audio generating system for generating a contextual audio related to an image. The audio generating system includes a processor and a memory communicatively coupled to the processor. The memory may store the processor-executable instructions, which, on execution, causes the processor to determine scene-theme of a scene in the image by analyzing the image received from an image repository. The scene-theme may be determined based on key image features in the image and one or more scene-objects, corresponding to the key image features in the image. Further, the processor may determine a viewer theme of the image based on contextual data associated with the image. Upon determining the viewer theme, the processor may retrieve one or more audio files matching the one or more scene-objects and the contextual data in real-time by performing a real-time search using textual descriptions of the one or more scene-objects and the contextual data. Further, the processor may identify one or more relevant audio files from the one or more audio files based on relationship between the scene-theme, the one or more scene-objects, the viewer theme, the contextual data and metadata of the one or more audio files. Furthermore, the processor may assign a contribution weightage to each of the one or more relevant audio files and one or more substitute audio files based on the contextual data. Finally, the processor may correlate the one or more relevant audio files and the one or more substitute audio files based on the contribution weightage, thereby generating the contextual audio related to the image.

Furthermore, the present disclosure includes a non-transitory computer readable medium including instructions stored thereon that when processed by at least one processor causes an audio generating system to perform operations including determining scene-theme of a scene in the image by analyzing the image received from an image repository. The scene-theme is determined based on key image features in the image and one or more scene-objects, corresponding to the key image features, in the image. Upon determining the scene-theme, the instructions cause the processor to determine a viewer theme of the image based on contextual data associated with the image. Further, the instructions cause the processor to retrieve one or more audio files matching the one or more scene-objects and the contextual data in real-time by performing a real-time search using textual descriptions of the one or more scene-objects and the contextual data. Furthermore, the instructions cause the processor to identify one or more relevant audio files from the one or more audio files based on relationship between the scene-theme, the one or more scene-objects, the viewer theme, the contextual data and metadata of the one or more audio files. Upon identifying the one or more relevant audio files, the instructions cause the processor to assign a contribution weightage to each of the one or more relevant audio files and one or more substitute audio files based on the contextual data. Finally, the instructions cause the processor to correlate the one or more relevant audio files and the one or more substitute audio files based on the contribution weightage, thereby generating the contextual audio related to the image.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the scope of the disclosure.

The terms "comprises", "comprising", "includes" or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Disclosed herein are a method and a system for generating a contextual audio related to an image. The contextual audio may provide a holistic audio effect in accordance with context of the image, thus recreating the audio that might have been present when the image was captured. An audio generating system may receive the image from an image repository and determines key image features in the image and one or more scene-objects, corresponding to the key image features. As an example, the one or more scene-objects include information related to at least one of objects present in the scene, actions of the objects present in the scene and background of the objects present in the scene. Further, the audio generating system may analyze the image based on the key image features in the image and one or more scene-objects to determine scene-theme of a scene in the image. Upon determining the scene-theme, the audio generating system may determine a viewer theme of the image based on contextual data associated with the image. As an example, the contextual data includes location, date, time or weather condition when the image is viewed, user profile data from social networking websites, user preferences or user inputs. As an example, consider the scene-theme is "Beach" and the contextual data is "time: 10 PM, rainy season", then the viewer theme may be "raining night". Therefore, based on the user inputs or the user preferences that are present under the contextual data, the viewer theme may change.

Upon determining the viewer theme, the audio generating system, may generate one or more audio files matching the one or more scene-objects and the contextual data in real-time by performing a real-time search using textual descriptions of the one or more scene-objects and the contextual data. From results of the real-time search, the audio generating system may identify one or more relevant audio files from the one or more audio files based on relationship between the scene-theme, the one or more scene-objects, the viewer theme, the contextual data and metadata of the one or more audio files. Upon identifying the one or more relevant audio files, the audio generating system may assign a contribution weightage to each of the one or more relevant audio files and one or more substitute audio files based on the contextual data.

The one or more substitute audio files may be generated by the audio generating system in real-time for the one or more relevant audio files when the metadata of the one or more audio files matches with metadata of the one or more relevant audio files. As an example, if the one or more relevant audio files are related to a forest, then the one or more substitute audio files are sounds that provide additional effects such as birds chirping, lion roaring, bees buzzing and the like. Finally, the audio generating system may correlate the one or more relevant audio files and the one or more substitute audio files based on the contribution weightage, thereby generating the contextual audio related to the image. The contribution weightage may be assigned based on level of contribution of each of the one or more relevant audio files and the one or more substitute audio files required for generating the contextual audio. The contextual audio generated may not be static i.e. the contextual audio may change dynamically with respect to time, location, viewer and the like. The present disclosure may provide a way to associate sights/scenes with audio in an effective and impactful manner.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
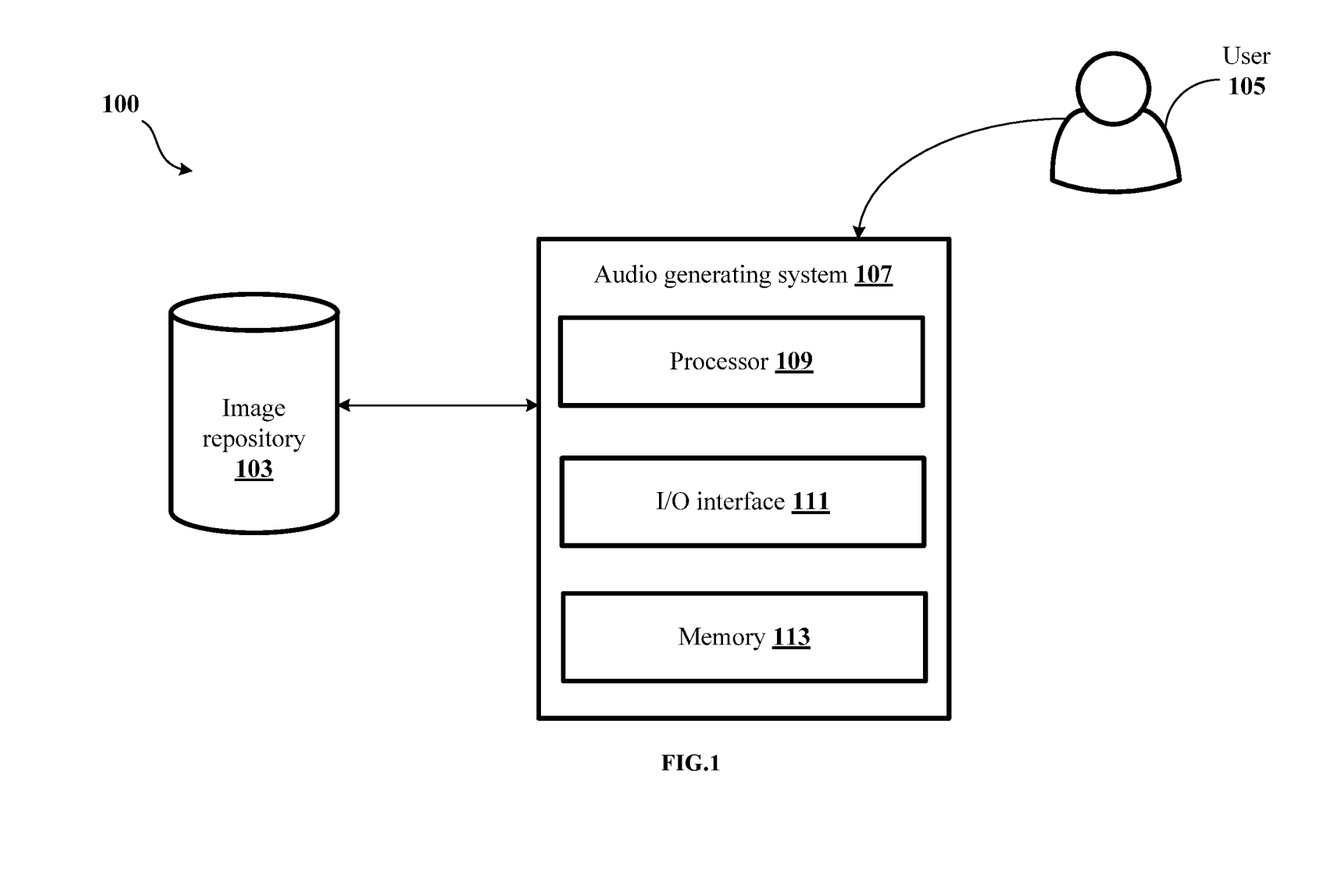
FIG. 1 shows an exemplary architecture for generating a contextual audio related to an image in accordance with some embodiments of the present disclosure.

FIG. 1 shows an exemplary architecture for generating a contextual audio related to an image in accordance with some embodiments of the present disclosure.

The architecture 100 includes an image repository 103, a user 105 and an audio generating system 107. As an example, the image repository 103 is any storage space that stores images. In this disclosure, mention of the word "images" should be construed as digital images. In some embodiments, the image repository 103 may be present within the audio generating system 107. In some embodiments, the image repository 103 may be externally associated to the audio generating system 107 and may interact with the audio generating system 107 via a communication network (not shown in the FIG. 1). The communication network may be at least one of a wired communication network and a wireless communication network.

The audio generating system 107 includes a processor 109, an Input/Output (I/O) interface 111 and a memory 113. The I/O interface 111 may be used to retrieve the image from the image repository 103. In some embodiments, the user 105 may choose the image to be retrieved from the image repository 103. Upon retrieving the image, the processor 109 may analyze the image to determine scene-theme of a scene present in the image. As an example, the scene is any real-world action such as kids running, players playing a game of football in a stadium, vehicles moving on a road, a beach, sunset and the like. The processor 109 may determine the scene-theme based on key image features and one or more scene-objects corresponding to the key image features in the image. In some embodiments, the one or more scene-objects may include, but not limited to, information related to at least one of objects present in the scene, actions of the objects present in the scene and background of the objects present in the scene. The key image features may be predefined properties of the objects that enable the processor 109 to recognize the objects in the scene. As an example, the key image features include edges of the object, color of the object, shape of the object, smoothness of the object, color of neighboring object in the scene and the like. As an example, if the shape of the object is "shapeless" and the color of the object is "blue", then the processor 109 may recognize the object as water. Therefore, by correlating the key image features, the processor 109 may recognize the objects present in the image. Further, as an example, consider an image that shows a beach captured from a distance. Therefore, by analyzing the image, the processor 109 may identify the following as shown in the below Table 1.

TABLE 1

| Image | Key features | Objects in the scene | Actions of the objects in the scene | Background of the objects in the scene |
|---|---|---|---|---|
| Beach captured from a distance | Object 1: Shape: X Color: Y Color of neighboring object: N Object 2: Shape: $X_1$ Color: $Y_2$ | Object 1: Water  Object 2: Sand | Flowing  Stationary - no actions | Sunny, Clear sky  Sunny, Clear sky |

Further, as an example, if the objects present in the scene are water, sand, coconut trees, ships, kids playing, shells and the like, the processor 109 may recognize the scene-theme as the beach. Upon determining the scene-theme, the processor 109 may determine a viewer theme of the image based on contextual data associated with the image. As an example, the contextual data includes location, date, time or weather condition when the image is viewed, user profile data from social networking websites, user preferences or user inputs. As an example, consider an image of a forest, the exemplary contextual data associated with the image may be time: 10 PM and weather: rainy. Based on the user profile data from social networking sites of the user 105, the processor 109 may obtain the contextual data that the user 105 is a bird lover, animal lover, nature-lover and the like. Further, the processor 109 may perform real-time search using textual descriptions of the one or more scene-objects and the contextual data to retrieve one or more audio files matching the one or more scene-objects and the contextual data in real-time. Upon retrieving the one or more audio files, the processor 109 may identify one or more relevant audio files from the one or more audio files. In some embodiments, the one or more relevant audio files may be identified based on relationship between the scene-theme, the one or more scene-objects, the viewer theme, the contextual data and metadata of the one or more audio files. The processor 109 may self-learn the relationship between the scene-theme, the one or more scene-objects, the viewer theme, the contextual data and metadata of the one or more audio files. Further, the processor 109 may generate one or more substitute audio files for the one or more relevant audio files in real-time when metadata of the one or more audio files may match metadata of the one or more relevant audio files. The one or more substitute audio files may be generated to provide additional sound effects related to one or more unseen objects in the scene. In some embodiments, the one or more unseen objects are related to the scene present in the image.

As an example, consider an image of a lion in a forest on a windy day. The scene-theme identified for this image is "forest". Therefore, for the scene-theme of the image "forest", the one or more relevant audio files may include audio related to the one or more objects present in the scene such as "roar of the lion", "sound of leaves moving due to wind", "sound of wind blowing" and the like. On the other hand, the one or more substitute audio files may include audio related to the one or more unseen objects related to the scene such as "birds chirping", "river flowing", "bees buzzing" and the like. Further, the processor 109 may assign a contribution weightage to each of the one or more relevant audio files and one or more substitute audio files based on the contextual data. The contribution weightage may indicate level of contribution of each of the one or more relevant audio files and the one or more substitution audio files in a contextual audio related to the image. As an example, if the user 105 is a bird lover, the level of contribution of the substitute audio file related "birds chirping" may be high, that in turn demands assigning a high contribution weightage.

Finally, the processor 109 may correlate the one or more relevant audio files and the one or more substitution audio files based on the contribution weightage, thereby generating the contextual audio related to the image. Therefore, when the user 105 selects the image to view, the processor 109 may play the contextual audio in the background. Further, the one or more relevant audio files and the one or more substitute audio files may be logged in the memory 113 for self-learning of the audio generating system 107.

Figure 2:
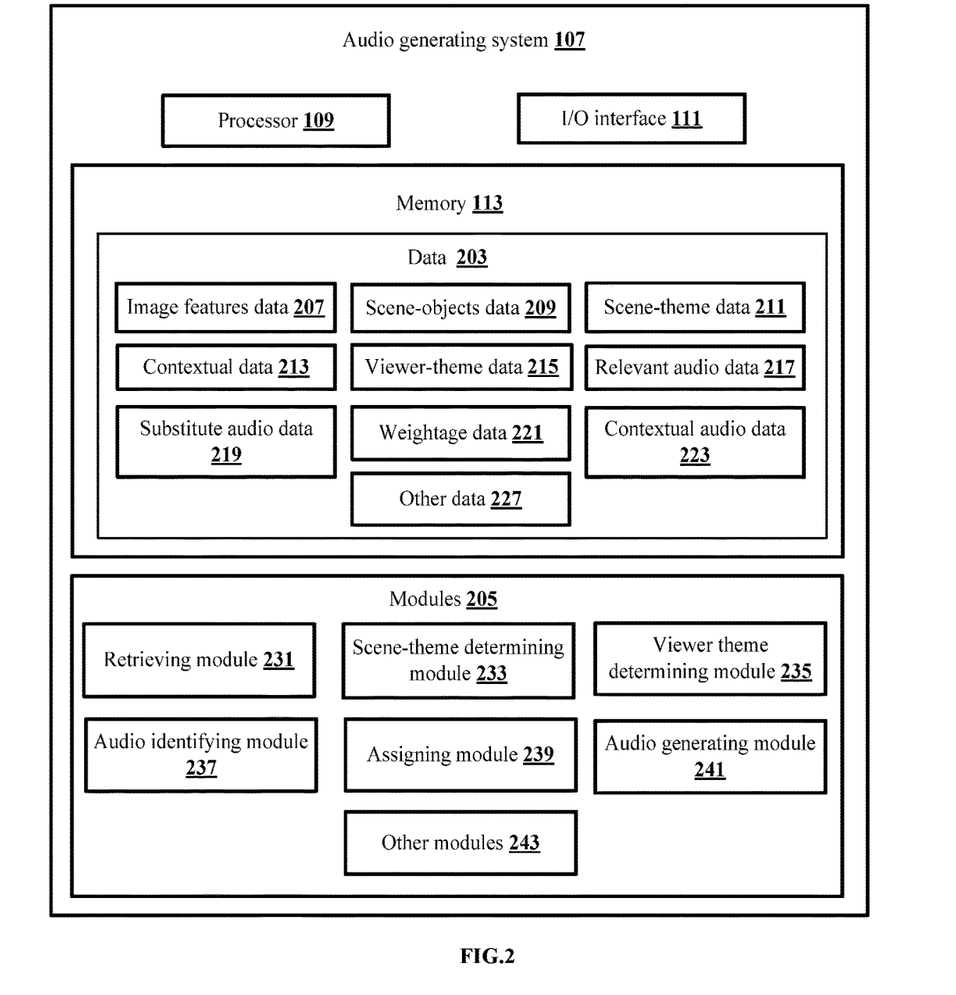
FIG. 2 shows a detailed block diagram of an audio generating system for generating a contextual audio related to an image in accordance with some embodiments of the present disclosure.

FIG. 2 shows a detailed block diagram of an audio generating system for generating a contextual audio related to an image in accordance with some embodiments of the present disclosure.

In some implementations, the audio generating system 107 may include data 203 and modules 205. As an example, the data 203 is stored in the memory 113 configured in the audio generating system 107 as shown in the FIG. 2. In one embodiment, the data 203 may include image features data 207, scene-objects data 209, scene-theme data 211, contextual data 213, viewer-theme data 215, relevant audio data 217, substitute audio data 219, weightage data 221, contextual audio data 223 and other data 227. In the illustrated FIG. 2, modules 205 are described herein in detail.

In some embodiments, the data 203 may be stored in the memory 113 in form of various data structures. Additionally, the data 203 can be organized using data models, such as relational or hierarchical data models. The other data 227 may store data, including temporary data and temporary files, generated by the modules 205 for performing the various functions of the audio generating system 107.

In some embodiments, the data 203 stored in the memory 113 may be processed by the modules 205 of the audio generating system 107. The modules 205 may be stored within the memory 113. In an example, the modules 205 communicatively coupled to the processor 109 configured in the audio generating system 107, may also be present outside the memory 113 as shown in FIG. 2 and implemented as hardware. As used herein, the term modules refer to an application specific integrated circuit (ASIC), an electronic circuit, a processor (shared, dedicated, or group) and memory that execute one or more software or firmware programs, a combinational logic circuit, and/or other suitable components that provide the described functionality.

In an embodiment, the modules 205 may include, for example, a retrieving module 231, a scene-theme determining module 233, a viewer theme determining module 235, an audio identifying module 237, an assigning module 239, an audio generating module 241 and other modules 243. The other modules 243 may be used to perform various miscellaneous functionalities of the audio generating system 107. It will be appreciated that such aforementioned modules 205 may be represented as a single module or a combination of different modules.

In some embodiments, the retrieving module 231 may retrieve an image from an image repository 103 associated with the audio generating system 107. The image may be related to a scene indicating any real-world action.

In some embodiments, the scene-theme determining module 233 may determine scene-theme of the scene present in the image retrieved. To determine the scene-theme, the scene-theme determining module 233 may initially analyze the image to identify key image features. The key image features may be predefined properties of objects that help in recognizing the objects in the scene. As an example, the key image features include edges of the object, color of the object, shape of the object, smoothness of the object, color of neighboring object in the scene and the like. The key image features identified by the scene-theme determining module 233 may be stored as image features data 207. Based on the key image features of the image, the scene-theme determining module 233 may determine one or more scene objects corresponding to the key image features. In some embodiments, the one or more scene-objects may include, but not limited to, information related to at least one of objects present in the scene, actions of the objects present in the scene and background of the objects present in the scene. The one or more scene-objects determined by the scene-theme determining module 233 may be stored as the scene-objects data 209. Furthermore, the scene-theme determining module 233 may determine the scene-theme by correlating the key image features and the one or more scene-objects of the image. The scene-theme may be stored as the scene-theme data 211.

As an example, when the image is related to kids playing in a park, the objects in the scene include "lawn", "swing", "kids", "see-saw", "slide", "dogs" and the like, actions of the objects in the scene may be "swing swinging", "kids running", "dogs barking" and the like, the background of the objects may be "Sunny day", "windy" and the like, and the scene-theme would be "Park". In some embodiments, the scene-theme determining module 233 may determine the scene-theme based on the key image features and the one or more scene-objects using one or more predefined techniques such as recurring neural network and deep learning techniques.

In some embodiments, the viewer theme determining module 235 may determine viewer theme of the image based on contextual data 213 associated with the image. The viewer theme of the image may be stored as the viewer-theme data 215. In some embodiments, the contextual data 213 indicates the context with respect to the image such as location, date, time or weather condition when the image is viewed, user profile data from social networking websites, user preferences or user inputs of the user 105 who may want to view the image. As an example, consider an image of a forest, the exemplary contextual data 213 associated with the image is time: 10 PM and weather: rainy. Based on the user profile data retrieved from social networking sites associated with the user 105, the processor 109 may obtain the contextual data 213 that the user 105 is a bird lover, animal lover, nature-lover and the like. As an example, if the user 105 wants to view the image considering that the weather condition is rainy in that location where the image was captured, the viewer theme may be "Rainy day" or "Rainy night".

In some embodiments, the audio identifying module 237 may identify one or more audio files matching the one or more scene-objects and the contextual data 213 in real-time. To identify the one or more audio files, the audio identifying module 237 may use textual descriptions of the one or more scene-objects and the contextual data 213 and perform a real-time search. Based on the real-time search, the audio identifying module 237 may retrieve the one or more audio files along with metadata of the one or more audio files. Further, the audio identifying module 237 may identify one or more relevant audio files based on relationship between the scene-theme, the one or more scene-objects, the viewer theme, the contextual data 213 and the metadata of the one or more audio files. The one or more relevant audio files may be stored as the relevant audio data 217. As an example, if the scene-theme is "beach", the viewer theme is "rainy night" and the contextual data 213 is "time: 10 PM", and if the audio file include audio of waves of a beach while raining, the audio file is considered as the relevant audio file. The audio identifying module 237 may self-learn the relationship between the scene-theme, the one or more scene-objects, the viewer theme, the contextual data 213 and metadata of the one or more audio files.

Upon identifying the one or more relevant audio files, the audio identifying module 237 may identify one or more substitute audio files for the one or more relevant audio files in real-time when metadata of the one or more audio files may match metadata of the one or more relevant audio files. The one or more substitute audio files may be stored as the substitute audio data 219. As an example, consider the scene-theme as "forest", viewer theme as "sunny day" and the contextual data 213 as "bird lover". The objects in the scene may be trees, bees, flowers and elephant. The metadata of the one or more audio files that includes audio of "birds chirping" matches the metadata of the one or more relevant files that are associated with the scene-theme "forest", viewer theme "sunny day" and contextual data 213 "bird lover". Therefore, though the object "birds" is not present in the scene, the one or more audio files may match the context. These type of audio files are generated as the one or more substitute audio files of the one or more relevant audio files. In some embodiments, the one or more substitute audio files may provide additional sound effects related to one or more unseen objects in the scene, but, related to the scene present in the image. In some embodiments, the one or more substitute audio files may also be the audio files related to the image at different time or weather conditions. As an example, if the image is of a monument "Tajmahal" in day light on a sunny day, the one or more relevant audio files are the ones related to the context of sunny day. However, the one or more substitute audio files of the same image may be related to the context of "Tajmahal" on a windy day.

In some embodiments, the assigning module 239 may assign a contribution weightage to each of the one or more relevant audio files and each of the one or more substitute audio files based on the contextual data 213. The assigning module 239 may assign the contribution weightage based on level of contribution of each of the one or more relevant audio files and the one or more substitute audio files required for generating a contextual audio for the image. The contribution weightage assigned by the assigning module 239 may be stored as the weightage data 221. As an example, if the user inputs, that are a part of the contextual data 213, demand to hear certain type of audio when the image is viewed, the one or more relevant audio files corresponding to that type of audio are given a higher contribution weightage than other relevant audio files. Further, as an example, if the weather condition is "rainy", the relevant audio file corresponding to rain is given a higher contribution weightage. In some embodiments, the assigning module 239 may self-learn the level of contribution of a certain type of audio required for a certain image. As an example, if the image captured is of a highway where numerous vehicles are stuck in a traffic jam, the assigning module 239 self-learns that higher contribution weightage should be given to the relevant audio files related to "vehicle horn", "crowd shouting" and the like. If the image captured is of the same highway where vehicles are moving freely, the assigning module 239 may self-learn that higher contribution weightage should be given to the relevant audio files related to "accelerating". Also, the contribution weightage assigned to each of the one or more relevant audio files and the one or more substitute audio files corresponding to the image may vary for different users, since the contextual data 213 may be different.

In some embodiments, the audio generating module 241 may generate the contextual audio related to the image by correlating the one or more relevant audio files and the one or more substitute audio files based on the contribution weightage. The contextual audio related to the image may be stored as the contextual audio data 223. When the image is viewed by the user 105, the contextual audio generated by the audio generating module 241 is played, thereby reproducing the audio related to the image when it was captured.

Henceforth, the process for generating the contextual audio for the image is explained with the help of one or more examples for better understanding of the present disclosure. However, the one or more examples should not be considered as limitation of the present disclosure.

Consider an exemplary image of a scene indicating a dog playing in the beach. Therefore, based on key image features identified in the image, the one or more scene-objects that may be determined are:

Objects present in the scene: dog, sea, waves, coconut tree.

Action of the objects present in the scene: "Dog barking", "High tides approaching the shore", and the like.

Background of the objects present in the scene: "Bright Clear sky".

Scene-theme of the scene: Beach

The contextual data 213 and viewer theme associated with the exemplary image may be:

Contextual data:
User preference: Sound of waves
Time: 11 AM
Viewer theme: Windy day
Relevant audio files may be related to:
Dog barking
Sound of waves
Sound of wind
Substitute audio files may be related to:
Sound of coconut tree swinging due to wind
Sound of birds chirping
Sound of waves hitting rocks
Contribution weightage assigned for the relevant audio files and the substitute audio files may be (considering a scale of 10):
Dog barking—9
Sound of waves—8 (Due to the user preference)
Sound of wind—6
Sound of coconut tree swinging due to wind—4
Sound of birds chirping—4
Sound of waves hitting the rock—3

Therefore, the contextual audio generated for the exemplary image may be a correlation of the audio files based on the assigned contribution weightage that produces a blend of all the above audio files when the exemplary image is viewed.

Figure 3:
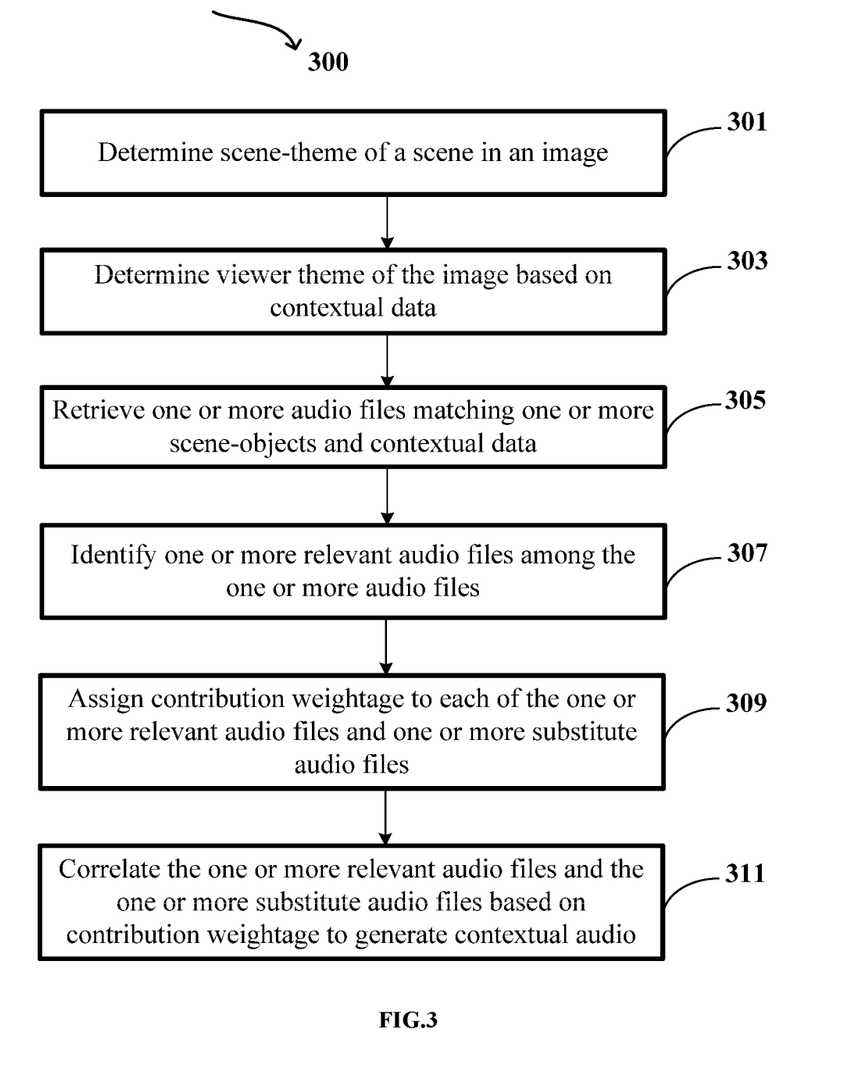
FIG. 3 shows a flowchart illustrating a method of generating a contextual audio related to an image in accordance with some embodiments of the present disclosure.

FIG. 3 shows a flowchart illustrating a method of generating a contextual audio related to an image in accordance with some embodiments of the present disclosure.

As illustrated in FIG. 3, the method 300 includes one or more blocks illustrating a method of generating a contextual audio related to an image. The method 300 may be described in the general context of computer executable instructions. Generally, computer executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

At block 301, the method 300 may include determining, by a processor 109 of the audio generating system 107, scene-theme of a scene in the image by analyzing the image received from an image repository 103 based on key image features in the image and one or more scene-objects, corresponding to the key image features, in the image. In some embodiments, the key image features may be predefined characteristics of the objects that enable the processor 109 to recognize the objects in the scene. In some embodiments, the one or more scene-objects may include, but not limited to, information related to at least one of objects present in the scene, actions of the objects present in the scene and background of the objects present in the scene.

At block 303, the method 300 may include determining, by the processor 109, a viewer theme of the image based on contextual data 213 associated with the image. As an example, the contextual data 213 includes location, date, time or weather condition when the image is viewed, user profile data from social networking websites, user preferences or user inputs.

At block 305, the method 300 may include, retrieving, by the processor 109, one or more audio files matching the one or more scene-objects and the contextual data 213 in real-time by performing a real-time search. In some embodiments, the real-time search may be performed using textual descriptions of the one or more scene-objects and the contextual data 213. The processor 109 may also retrieve metadata of each of the one or more audio files.

At block 307, the method 300 may include, identifying, by the processor 109, one or more relevant audio files from the one or more audio files based on relationship between the scene-theme, the one or more scene-objects, the viewer theme, the contextual data 213 and metadata of the one or more audio files. The processor 109 may self-learn the relationship based on logged audio files related to historical contextual audios that generated. Further, the processor 109 may generate one or more substitute audio files for the one or more relevant audio files in real-time when the metadata of the one or more audio files may match metadata of the one or more relevant audio files. The one or more substitute audio files may be generated to provide additional sound effects related to one or more unseen objects in the scene. In some embodiments, the one or more unseen objects are related to the scene present in the image.

At block 309, the method 300 may include, assigning a contribution weightage to each of the one or more relevant audio files and one or more substitute audio files based on the contextual data 213. In some embodiments, the contribution weightage may be assigned based on level of contribution of each of the one or more relevant audio files and the one or more substitute audio files required for generating the contextual audio.

At block 311, the method 300 may include, correlating the one or more relevant audio files and the one or more substitute audio files based on the contribution weightage. Based on the correlation, the processor 109 may generate the contextual audio related to the image which may be played when the image is viewed. The contextual audio may reproduce the sound that may have existed when the image was captured.

Figure 4:
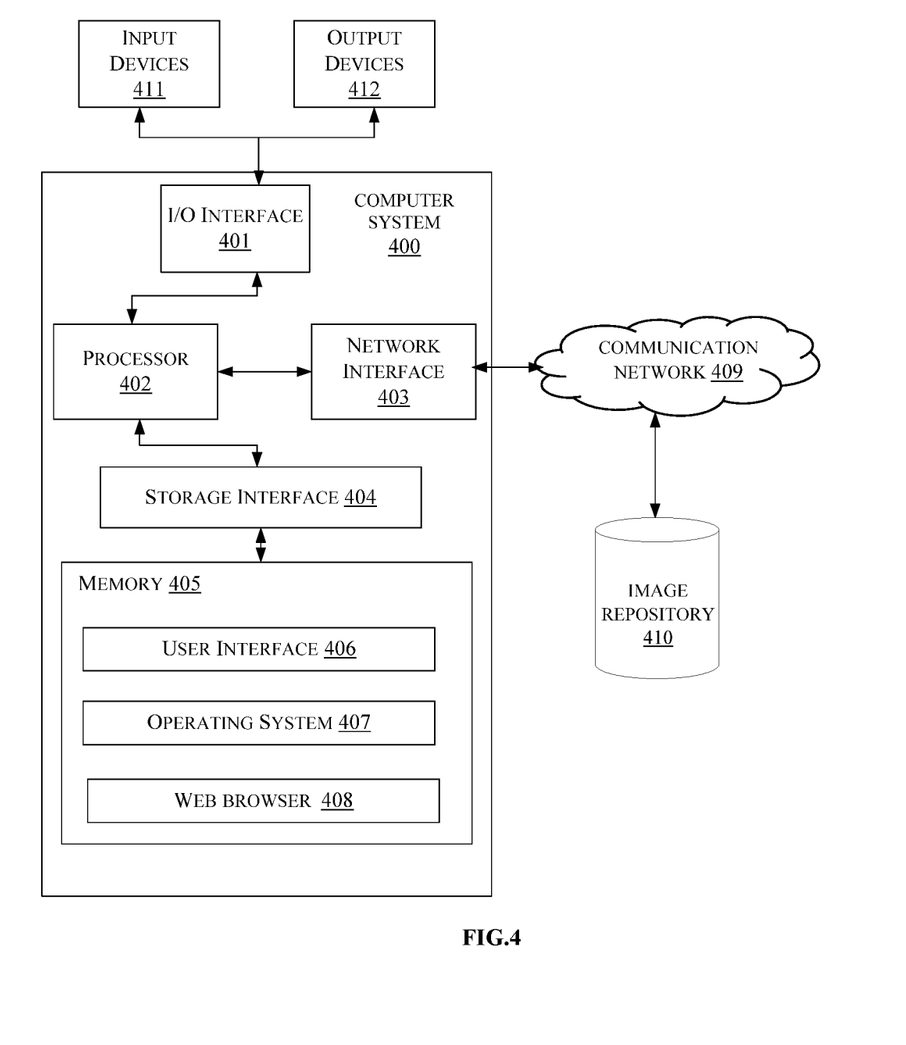
FIG. 4 is a block diagram of an exemplary computer system for implementing embodiments consistent with the present disclosure.

FIG. 4 is a block diagram of an exemplary computer system for implementing embodiments consistent with the present disclosure.

In an embodiment, FIG. 4 illustrates a block diagram of an exemplary computer system 400 for implementing embodiments consistent with the present invention. In an embodiment, the computer system 400 can be audio generating system 107 that is used for generating a contextual audio related to an image. The computer system 400 may include a central processing unit ("CPU" or "processor") 402. The processor 402 may include at least one data processor for executing program components for executing user or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n /b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, computer system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with an image repository 410. The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. The image repository 410 may include any storage space that is capable of storing images. In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, a user interface 406, an operating system 407, a web browser 408 etc. In some embodiments, the computer system 400 may store user/application data, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), International Business Machines (IBM) OS/2, Microsoft Windows (XP, Vista/7/8, etc.), Apple iOS, Google Android, Blackberry Operating System (OS), or the like. The User interface 406 may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, scrollers, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, JavaScript, AJAX, HTML, Adobe Flash, etc.), or the like.

In some embodiments, the computer system 400 may implement the web browser 408 stored program components. The web browser 408 may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Examples of advantages of the embodiment of the present disclosure are illustrated herein.

In an embodiment, the present disclosure provides a method and a system for generating a contextual audio related to an image.

The present disclosure provides a feature wherein the contextual audio generated for an image provides a holistic audio effect in accordance with the context of the image, thus recreating the audio that might have been present when the image was captured.

The present disclosure provides a feature wherein the holistic audio effect can be modified according to user preferences.

The present disclosure provides a feature wherein the contextual audio generated is not static i.e. the contextual audio may change dynamically with respect to time, location, viewer and the like.

The present disclosure provides a way to associate sights/scenes with sounds in an effective and impactful manner.

A description of an embodiment with several components in communication with each other does not imply that all such components are required. On the contrary a variety of optional components are described to illustrate the wide variety of possible embodiments of the invention.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for generating a contextual audio related to an image. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

What is claimed is:

1. A method of generating a contextual audio related to an image, the method comprising:
    determining, by an audio generating system, a scene-theme of a scene in the image by analyzing the image received from an image repository, wherein the scene-theme is determined based on key image features in the image and one or more scene-objects, corresponding to the key image features, in the image;
    determining, by the audio generating system, a viewer theme of the image based on contextual data associated with the image;
    retrieving, by the audio generating system, one or more audio files matching the one or more scene-objects and the contextual data in real-time by performing a real-time search using textual descriptions of the one or more scene-objects and the contextual data;
    identifying, by the audio generating system, one or more relevant audio files from the one or more audio files based on relationship between the scene-theme, the one or more scene-objects, the viewer theme, the contextual data and metadata of the one or more audio files;
    assigning, by the audio generating system, a contribution weightage to each of the one or more relevant audio files and one or more substitute audio files based on the contextual data; and
    correlating, by the audio generating system, the one or more relevant audio files and the one or more substitute audio files based on the contribution weightage, thereby generating the contextual audio related to the image.

2. The method as claimed in claim 1, wherein the one or more scene-objects comprises information related to at least one of objects present in the scene, actions of the objects present in the scene and background of the objects present in the scene.

3. The method as claimed in claim 1, wherein the contextual data comprises at least one of location, date, time or weather condition when the image is viewed, user profile data from social networking websites, user preferences or user inputs.

4. The method as claimed in claim 1, wherein the one or more substitute audio files are generated by the audio generating system in real-time for the one or more relevant audio files when the metadata of the one or more audio files matches with metadata of the one or more relevant audio files.

5. The method as claimed in claim 1, wherein the one or more substitute audio files are generated to provide additional sound effects related to one or more unseen objects in the scene, wherein the one or more unseen objects are related to the scene.

6. The method as claimed in claim 1, wherein the contribution weightage is assigned based on level of contribution of each of the one or more relevant audio files and the one or more substitute audio files required for generating the contextual audio.

7. The method as claimed in claim 1 further comprises playing, by the audio generating system, the corresponding contextual audio when the image is viewed.

8. The method as claimed in claim 1 further comprises logging, by the audio generating system, the one or more relevant audio files and the one or more substitute audio files for self-learning of the audio generating system.

9. An audio generating system for generating a contextual audio related to an image, the audio generating system comprising:
    a processor; and
    a memory communicatively coupled to the processor, wherein the memory stores the processor-executable instructions, which, on execution, causes the processor to:
        determine a scene-theme of a scene in the image by analyzing the image received from an image repository, wherein the scene-theme is determined based on key image features in the image and one or more scene-objects, corresponding to the key image features in the image;
        determine a viewer theme of the image based on contextual data associated with the image;
        retrieve one or more audio files matching the one or more scene-objects and the contextual data in real-time by performing a real-time search using textual descriptions of the one or more scene-objects and the contextual data;
        identify one or more relevant audio files from the one or more audio files based on relationship between the scene-theme, the one or more scene-objects, the viewer theme, the contextual data and metadata of the one or more audio files;
        assign a contribution weightage to each of the one or more relevant audio files and one or more substitute audio files based on the contextual data; and
        correlate the one or more relevant audio files and the one or more substitute audio files based on the contribution weightage, thereby generating the contextual audio related to the image.

10. The audio generating system as claimed in claim 9, wherein the one or more scene-objects comprises information related to at least one of objects present in the scene, actions of the objects present in the scene and background of the objects present in the scene.

11. The audio generating system as claimed in claim 9, wherein the contextual data comprises at least one of location, date, time or weather condition when the image is viewed, user profile data from social networking websites, user preferences or user inputs.

12. The audio generating system as claimed in claim 9, wherein the processor generates the one or more substitute audio files in real-time for the one or more relevant audio files when the metadata of the one or more audio files matches with metadata of the one or more relevant audio files.

13. The audio generating system as claimed in claim 9, wherein the processor generates the one or more substitute audio files to provide additional sound effects related to one or more unseen objects in the scene, wherein the one or more unseen objects are related to the scene.

14. The audio generating system as claimed in claim 9, wherein the processor assigns the contribution weightage based on level of contribution of each of the one or more relevant audio files and the one or more substitute audio files required for generating the contextual audio.

15. The audio generating system as claimed in claim 9, wherein the processor is further configured to play the corresponding contextual audio when the image is viewed.

16. The audio generating system as claimed in claim 9 self-learns by logging the one or more relevant audio files and the one or more substitute audio files.

17. A non-transitory computer readable medium including instructions stored thereon that when processed by at least one processor causes an audio generating system to perform operations comprising:

determining a scene-theme of a scene in the image by analyzing the image received from an image repository, wherein the scene-theme is determined based on key image features in the image and one or more scene-objects, corresponding to the key image features, in the image;

determining a viewer theme of the image based on contextual data associated with the image;

retrieving one or more audio files matching the one or more scene-objects and the contextual data in real-time by performing a real-time search using textual descriptions of the one or more scene-objects and the contextual data;

identifying one or more relevant audio files from the one or more audio files based on relationship between the scene-theme, the one or more scene-objects, the viewer theme, the contextual data and metadata of the one or more audio files;

assigning a contribution weightage to each of the one or more relevant audio files and one or more substitute audio files based on the contextual data; and correlating the one or more relevant audio files and the one or more substitute audio files based on the contribution weightage, thereby generating the contextual audio related to the image.

* * * * *